United States Patent
Jung et al.

(10) Patent No.: US 11,791,998 B1
(45) Date of Patent: Oct. 17, 2023

(54) METHOD FOR FORMING VIRTUAL PRIVATE NETWORK AND VIRTUAL PRIVATE NETWORK OPERATING SYSTEM WHICH PROVIDES VIRTUAL PRIVATE NETWORK BY PERFORMING SIGNATURE AND AUTHENTICATION BASED ON POST QUANTUM CRYPTOGRAPHY

(71) Applicant: NORMA Inc., Seoul (KR)

(72) Inventors: Hyunchul Jung, Seoul (KR); Chang Nyoung Song, Seoul (KR)

(73) Assignee: NORMA Inc., Seoul (KR)

( * ) Notice: Subject to any disclaimer, the term of this patent is extended or adjusted under 35 U.S.C. 154(b) by 0 days.

(21) Appl. No.: 18/079,897

(22) Filed: Dec. 13, 2022

(30) Foreign Application Priority Data

Sep. 1, 2022 (KR) .......... 10-2022-0110887

(51) Int. Cl.
*H04L 9/40* (2022.01)
*H04L 9/08* (2006.01)
*H04L 9/32* (2006.01)
*H04L 9/30* (2006.01)

(52) U.S. Cl.
CPC .......... *H04L 9/0869* (2013.01); *H04L 9/3093* (2013.01); *H04L 9/3247* (2013.01)

(58) Field of Classification Search
CPC .... H04L 9/3247; H04L 9/3093; H04L 9/0869
See application file for complete search history.

(56) References Cited

U.S. PATENT DOCUMENTS

| | | | | | |
|---|---|---|---|---|---|
| 5,295,188 | A | * | 3/1994 | Wilson | H04L 9/302 713/180 |
| 11,483,355 | B1 | * | 10/2022 | Abershitz | H04L 63/0823 |
| 2007/0005980 | A1 | * | 1/2007 | Miyazawa | H04L 63/0823 713/176 |
| 2008/0104401 | A1 | * | 5/2008 | Miyamoto | H04L 63/0442 713/175 |
| 2008/0155265 | A1 | * | 6/2008 | Yi | H04L 9/302 713/180 |
| 2011/0016325 | A1 | * | 1/2011 | Futa | H04L 9/3093 713/179 |
| 2013/0025437 | A1 | * | 1/2013 | Serletic | G10H 1/0025 84/634 |

(Continued)

FOREIGN PATENT DOCUMENTS

| | | |
|---|---|---|
| JP | 2007067631 A | 3/2007 |
| JP | 2014126866 A | 7/2014 |
| KR | 1020200099957 A | 8/2020 |

*Primary Examiner* — Ghodrat Jamshidi
(74) *Attorney, Agent, or Firm* — Nicholas Park

(57) ABSTRACT

The technical idea of the present invention relates to a method for forming a virtual private network and a virtual private network operating system, which provide a virtual private network by performing signature and authentication based on a post quantum cryptography. A method for forming a virtual private network performed by a server according to the technical idea of the present invention comprises the steps of: generating a private key including a first key vector corresponding to a grid and a second key vector having a first distance from the first key vector; receiving a handshake request from a client; performing a signature by using the private key; and transmitting a certificate and an authentication message including the signature to the client.

6 Claims, 8 Drawing Sheets

(56) References Cited

U.S. PATENT DOCUMENTS

| | | | |
|---|---|---|---|
| 2013/0312079 A1* | 11/2013 | McCallum | G06F 21/335 |
| | | | 726/10 |
| 2017/0111179 A1* | 4/2017 | Gero | H04L 9/3013 |
| 2019/0253261 A1* | 8/2019 | Gero | H04L 9/3013 |
| 2020/0412551 A1* | 12/2020 | Gero | H04L 9/3013 |
| 2021/0120404 A1* | 4/2021 | Sun | H04L 9/3247 |

* cited by examiner

FIG. 3

| Ver | Signature Algorithm | Serial # | Issuer | Validity | Subject | Public Key | Signature |

CA

METHOD FOR FORMING VIRTUAL PRIVATE NETWORK AND VIRTUAL PRIVATE NETWORK OPERATING SYSTEM WHICH PROVIDES VIRTUAL PRIVATE NETWORK BY PERFORMING SIGNATURE AND AUTHENTICATION BASED ON POST QUANTUM CRYPTOGRAPHY

CROSS-REFERENCE TO RELATED APPLICATION

This application claims priority to and the benefit of Korean Patent Application No. 10-2022-0110887, filed on Sep. 1, 2022, the disclosure of which is incorporated herein by reference in its entirety.

BACKGROUND

Technical Field

The present invention relates to a method for forming a virtual private network and a virtual private network operating system, which provides a virtual private network by performing signature and authentication based on a post quantum cryptography.

Related Art

A Virtual Private Network VPN is a private communication network used by companies or organizations to communicate over a public network without revealing its contents to the outside, and may form a secure channel between devices using a special TCP/IP-based protocol called a tunneling protocol.

As a method for implementing a virtual private network, there is a virtual private network based on a secure sockets layer (SSL) that can be connected to an internal network regardless of a place or a type of a terminal. The SSL virtual private network encrypts information in communication between a web browser and a server, and thus, as a security solution having a function of protecting information even when the information is leaked through hacking, internal system resources can be safely used from a remote place to the Internet.

Meanwhile, with the development of quantum computers, security of an encryption algorithm used in an existing cryptosystem has been weakened, and accordingly, a need for Post Quantum Cryptography, which is an encryption algorithm in which security is maintained even by a quantum computer, has emerged, and a virtual private network also needs to be applied to quantum resistance encryption algorithm in which security is maintained even by a quantum computer.

SUMMARY

Technical Problem

The present invention relates to a method for forming a virtual private network and a virtual private network operating system, wherein the method utilizes a post quantum cryptography in a process of performing authentication for a signature and a signature of a server in order to provide the virtual private network.

Technical Solution

A method for forming a virtual private network performed by a server according to an embodiment of the present invention comprises the steps of: generating a private key including a first key vector corresponding to a lattice and a second key vector having a first distance from the first key vector; receiving a handshake request from a client; performing a signature by using the private key; and transmitting a certificate and an authentication message including the signature to the client.

According to an embodiment, the private key may further include a key matrix corresponding to a random polynomial ring, and the performing of the signature may include obtaining a first bit based on the key matrix, obtaining a first hash value for the first bit and the authentication message, and generating a signature value by using the first hash value and the first key vector.

According to an embodiment, the acquiring of the first bit may include acquiring a signature random number by using a random number generator, calculating a first matrix by multiplying the key matrix by the signature random number, and acquiring upper N (N is a natural number) coefficients of a polynomial ring corresponding to the first matrix as the first bit.

According to an embodiment, the generating of the signature value by using the first hash value and the first key vector may include calculating the signature value by adding the signature random number to a value obtained by multiplying the first hash value and the first key vector.

According to an embodiment, the method may further include: determining whether the signature value is equal to or less than a predetermined value; and transmitting the certificate and the authentication message to the client only when the signature value is equal to or less than the predetermined value.

According to an embodiment, the signature may be characterized in that it includes the signature value and the first hash value.

According to an embodiment, the method for forming a virtual private network may further include receiving an encrypted symmetric key from the client, decrypting the symmetric key using the private key, and communicating with the client using the virtual private network using the symmetric key.

A method for forming a virtual private network performed by a client according to an embodiment of the present invention comprises the steps of: transmitting a handshake request to a server; receiving a certificate and an authentication message from the server in response to the handshake request; acquiring a signature and a public key from the certificate; and authenticating the server by using the signature and the public key, wherein the public key includes a key value generated by a key matrix corresponding to a random polynomial ring and at least one key vector corresponding to a lattice.

According to an embodiment, the signature may include a signature value and a first hash value, and the authenticating of the server by using the signature and the public key may include calculating a second matrix based on the signature value and the key matrix, acquiring upper N (N is a natural number) coefficients of a polynomial ring corresponding to the second matrix as second bits, and authenticating the server based on the second bits.

According to an embodiment, the authenticating of the server based on the second bit may include: obtaining the second bit and a second hash value for the authentication message; determining whether the second hash value is equal to the first hash value; and determining that the authentication of the server is successful when the second hash value is equal to the first hash value.

According to an embodiment, the calculating of the second matrix may include calculating, as the second matrix, a value obtained by subtracting a value obtained by multiplying the first hash value and the key value from a value obtained by multiplying the signature value and the key matrix.

According to an embodiment, the method for forming a virtual private network may further include: determining whether the signature value is equal to or less than a predetermined value; and performing an authentication procedure only when the signature value is equal to or less than the predetermined value.

According to an embodiment, the method for forming a virtual private network may further include: when the server is successfully authenticated, encrypting a symmetric key by using the public key; transmitting the encrypted symmetric key to the server; and communicating with the server by using the virtual private network by using the symmetric key.

BRIEF DESCRIPTION OF THE DRAWINGS

FIG. 3 is a diagram illustrating a data structure of a certificate according to an embodiment of the present invention.

DETAILED DESCRIPTION

Figure 1:
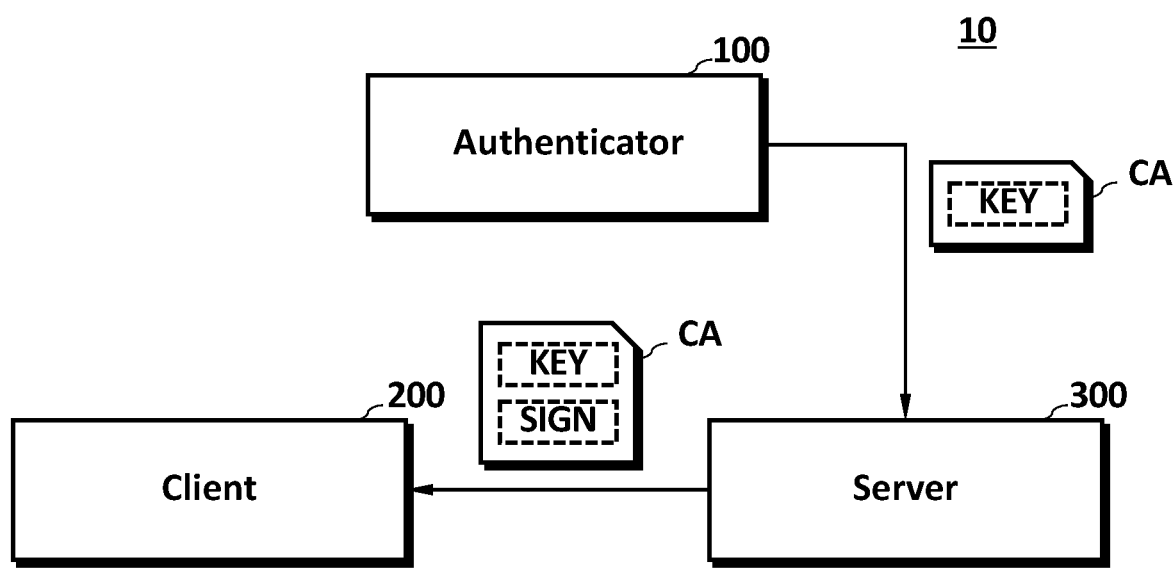
FIG. 1 is a block diagram illustrating a virtual private network operating system according to an example embodiment.

Hereinafter, exemplary embodiments of the present disclosure will be described in detail with reference to the accompanying drawings. Advantages and features of the present disclosure and methods of achieving them will become apparent with reference to embodiments described in detail below together with the accompanying drawings. However, the technical spirit of the present invention is not limited to the following embodiments, but may be implemented in various different forms, and the following embodiments are provided to complete the technical spirit of the present invention and to completely inform a person having ordinary skill in the art to which the present invention belongs of the scope of the present invention, and the technical spirit of the present invention is only defined by the scope of the claims.

In adding reference numerals to elements in each drawing, it should be noted that the same elements will be designated by the same reference numerals, if possible, even though they are shown in different drawings. In addition, in describing the present invention, when it is determined that a detailed description of related known configurations or functions may obscure the gist of the present invention, the detailed description thereof will be omitted.

Unless otherwise defined, all terms (including technical and scientific terms) used herein have the same meaning as commonly understood by one of ordinary skill in the art to which the inventive concept belongs. In addition, terms defined in commonly used dictionaries are not interpreted ideally or excessively unless they are clearly specifically defined. The terminology used herein is for the purpose of describing embodiments and is not intended to be limiting of the present invention. In the specification, a singular form includes a plural form unless specifically mentioned in the text.

In addition, in describing components of the present disclosure, terms such as first, second, A, B, (a), (b), and the like may be used. The term is used only to distinguish a component from another component, and the nature, sequence, or order of the corresponding component is not limited by the term. When it is described that a component is "connected", "coupled", or "connected" to another component, the component may be directly connected or connected to the other component, but it should be understood that another component may be "connected", "coupled", or "connected" between the components.

It will be further understood that the terms "comprises" and/or "comprising" used in the present invention do not preclude the presence or addition of one or more other components, steps, operations and/or elements, as mentioned.

Components included in any one embodiment and components including a common function may be described using the same name in another embodiment. Unless stated otherwise, the description described in any one embodiment may be applied to other embodiments, and the detailed description may be omitted within a redundant range or a range that can be obviously understood by a person having ordinary skill in the art.

Hereinafter, some embodiments of the present invention will be described in detail with reference to the accompanying drawings.

Hereinafter, the present invention will be described in detail with reference to preferred embodiments of the present invention and the accompanying drawings.

FIG. 1 is a block diagram illustrating a virtual private network operating system according to an example embodiment.

Referring to FIG. 1, the virtual private network operating system 10 may include an authenticator 100, a client 200, and a server 300. In an embodiment, the virtual private network operating system 10 may operate the virtual private network VPN according to the SSL scheme, but the technical spirit of the present disclosure is not limited thereto.

An authenticator 100 may represent a terminal operated by an institution that issues a CA to users. The authenticator 100 may perform a role of verifying the identity of the holder of the certificate CA in order to secure the trust of the transaction through the certificate CA, and may perform overall tasks for issuing the certificate CA and performing authentication tasks such as extracting, discarding, updating, and replacing the certificate CA. When the virtual private network VPN is configured, the certificate CA may serve to confirm whether the client 200 is the server 300 that intends to configure the virtual private network VPN in order to guarantee the reliability of the server 300, and the authenticator 100 may transmit the certificate CA to the server 300 through a predetermined procedure of authenticating the server 300. In an embodiment, the certificate CA may include information about a key KEY (e.g., a public key and/or a private key).

The client 200 may be a terminal operated by a user who desires to communicate with the server 300 through the virtual private network VPN. The authenticator 100 and the client 200 may include various communication-enabled terminal devices such as a cellular phone, a smart phone, a laptop, a personal computer (PC), a navigation, a personal communication system (PCS), a global system for mobile communications (GSM), a personal digital cellular (PDC), a personal handyphone system (PHS), a personal digital assistant (PDA), an international mobile telecommunication (IMT)-2000, a code division multiple access (CDMA)-2000, a W-code division multiple access (W-CDMA), a wireless broadband internet (Wibro) terminal, a smart pad, a tablet PC, etc.

The server 300 may be a server that provides various data to the client 200 through the virtual private network VPN, an operating computer that operates the server, and the like, and in one example, may be implemented in the cloud. In an embodiment, the server 300 may transmit data to the client 200 by using an application program such as a website, an application, or the like.

Each configuration of the virtual private network operating system 10 may be connected to communicate with each other in a wired or wireless manner, and when connected in a wired manner, each configuration included in the virtual private network operating system 10 may communicate with each other using a serial method, and when connected in a wireless manner, each configuration included in the virtual private network operating system 10 may communicate with each other using a wireless communication network, and the wireless communication network may include a Local Area Network (LAN), a Wide Area Network (WAN), the World Wide Web (WWW), a wired/wireless data communication network, a telephone network, a wired/wireless television communication network, 3G, 4G, 5G, 3rd Generation Partnership Project (3GPP), a 5th Generation Partnership Project (5GPP), a Long Term Evolution (LTE), a World Interoperability for Microwave Access (WIMAX), Wi-Fi, Internet (Internet), a Local Area Network (LAN), a Wireless Local Area Network (Wireless LAN), a Wide Area (WAN) Examples of the network include a communication network, a satellite broadcasting network, an analog broadcasting network, a digital multimedia broadcasting (DMB) network, and the like, but are not limited thereto.

The authenticator 100 may transmit the certificate CA including the key KEY to the server 300 through authentication for the server 300, and the server 300 may perform signature SIGN on the certificate CA. The client 200 may check whether the server 300 is a legitimate counterpart for forming the virtual private network VPN based on the signature SIGN, and form the virtual private network VPN through a handshake operation with the server 200 by using the key KEY included in the certificate. According to the technical spirit of the present disclosure, the signature SIGN included in the certificate CA may be generated by a post quantum algorithm using a lattice-based algorithm, and accordingly, even in a situation in which the certificate CA is exposed by an attacker using quantum computing when the certificate CA is transmitted between the client 200 and the server 300, information on the signature SIGN included in the certificate CA may not be exposed by the attacker, and accordingly, the virtual private network VPN may be formed in a safe environment.

Although FIG. 1 illustrates an example in which the authenticator 100 generates the key KEY and includes the key KEY in the certificate CA, this is merely an example, and it is natural that the technical idea of the present disclosure may also be applied to an example in which the server 300 generates the key KEY and includes the key KEY in the certificate CA.

In an embodiment, the client 200 may receive the certificate CA from the server 300, and may authenticate whether the certificate CA is authentic or not from the authenticator 100. Accordingly, the client 200 may check whether the server 300 is a proper subject for forming the virtual private network VPN.

In this specification, the operation of the virtual private network operating system and the components included therein may mean an operation performed by a processor included in each component based on a computer program including at least one instruction stored in a storage device included in each component, and the storage device may include a non-volatile memory, a volatile memory, a flash memory, a hard disk drive (HDD), a solid state drive (SSD), or the like. The processor may include at least one of a Central Processing Unit (CPU), a Graphic Processing Unit (GPU), a Neural Processing Unit (NPU), a RAM, a ROM, a system bus, and an application processor.

Figure 2:
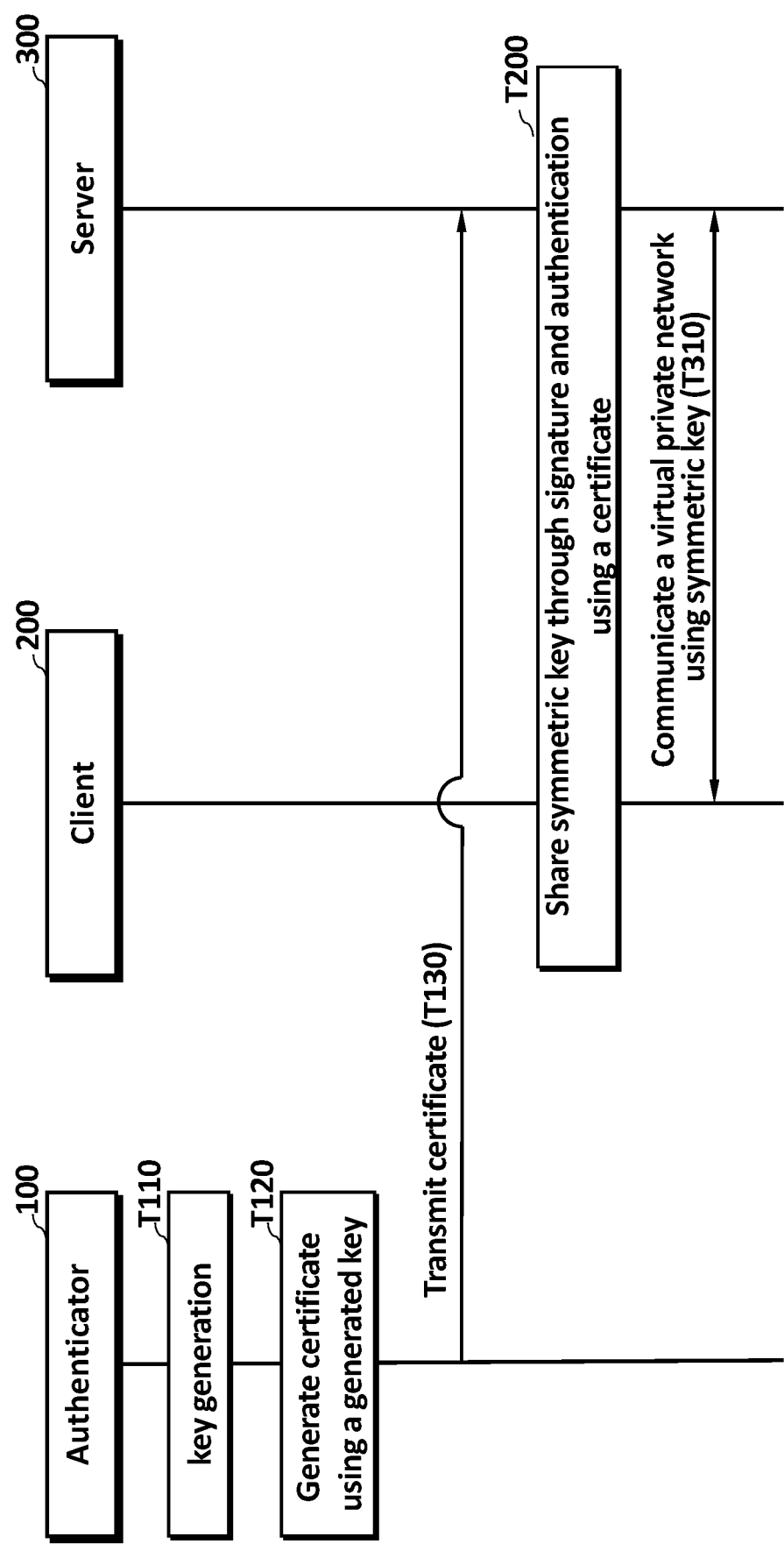
FIG. 2 is a flowchart illustrating a method of operating a virtual private network operating system according to an example embodiment.

FIG. 2 is a flowchart illustrating a method of operating a virtual private network operating system according to an example embodiment.

Referring to FIG. 2, the authenticator 100 may generate a key T110. According to the inventive concept, the authenticator 100 may generate a key based on a lattice-based algorithm, and a method of generating a key will be described in detail later with reference to FIGS. 4 through 6. The authenticator 100 may generate a certificate by using the generated key T120. In one example, the authenticator 100 may generate a certificate by including a data packet for a key in data constituting the certificate. The authenticator 100 may transmit the generated certificate to the server 300.

Although FIG. 2 illustrates an embodiment in which the authenticator 100 generates a key and generates a certificate by using the generated key, this is an embodiment, and the technical idea of the present disclosure may also be applied to an embodiment in which the server 300 generates a key.

The client 200 and the server 300 may perform the handshake including the signature and the authentication by using the certificate, and may share the symmetric key through the handshake T200. In the present specification, the handshake may mean a series of processes in which the client 200 and the server 300 initiate communication in order to communicate using the virtual private network VPN, and in the symmetric key scheme, a symmetric key may be exchanged as a result of the handshake.

The client 200 and the server 300 may perform communication through the virtual private network VPN by using the exchanged symmetric keys T310.

According to the technical spirit of the present disclosure, a post quantum algorithm based on a lattice algorithm may be used in a series of operations for forming the virtual private network VPN, and accordingly, even if a certificate is stolen by a hacker in the step of transmitting the certificate from the authenticator 100 to the server 300 T130 or the hand shake step T200, a key included in the certificate may not be decrypted by quantum computing, and as a result, the security of the virtual private network operating system 10 may be increased.

FIG. 3 is a diagram illustrating a data structure of a certificate according to an embodiment of the present invention.

Referring to FIG. 3, the certificate CA may include version information (Ver) of the certificate, signature algorithm information (Signature Algorithm) used for signature, a serial number (Serial #) of the certificate, information Issuer of the certificate, validity information (Validity), a subject of the certificate, information (Public Key) about the public key, and signature information (Signature).

The information about the public key (Public Key) may include information about a public key algorithm and the public key. In an embodiment of the disclosure, the public key algorithm may correspond to a post quantum key generation algorithm to be described below in FIG. 4, and the public key may be generated by a post quantum key generation algorithm to be described below in FIG. 4.

In addition, a signature algorithm may correspond to a quantum resistant signature algorithm to be described later in FIGS. 5 to 7, and a signature generated by the server 300 may be generated by a quantum resistant signature algorithm to be described later in FIGS. 5 to 7.

It should be understood that the structure of the certificate CA of FIG. 3 is an embodiment, the structure of the certificate CA may vary according to the policy selected by the certificate CA, and the technical idea of the present disclosure may be applied regardless of the structure of the certificate CA.

Figure 4:
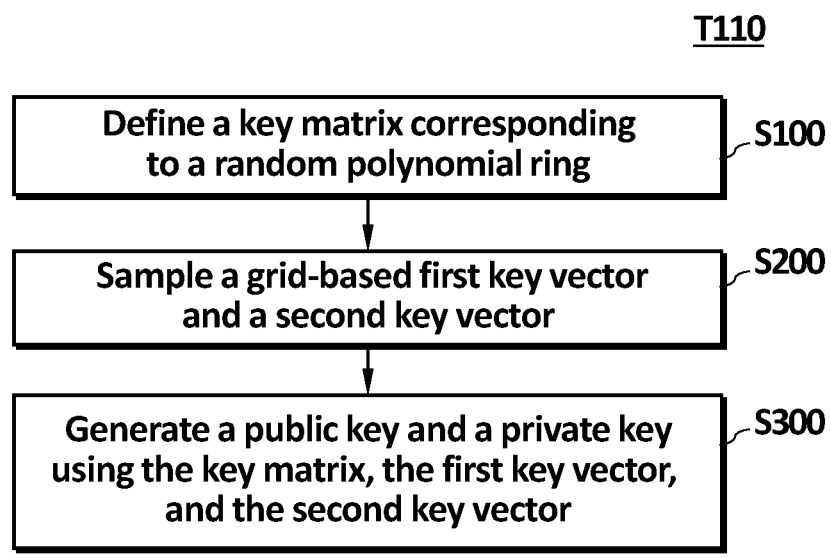
FIG. 4 is a flowchart illustrating a post quantum key generation algorithm according to an example embodiment.

FIG. 4 is a flowchart illustrating a post quantum key generation algorithm according to an example embodiment. In detail, FIG. 4 is a diagram illustrating the key generation method T110 of FIG. 2 in detail.

Referring to FIG. 4, the authenticator 100 may define a key matrix corresponding to the random polynomial ring S100. The polynomial ring may refer to a ring viewed from an abstract algebraic point of view with respect to a polynomial having a real number and a complex number as coefficients and an unknown number, and the random polynomial ring may refer to a polynomial ring of which coefficients are randomly determined. In addition, the key matrix corresponding to this may mean that the coefficient of the random polynomial ring is represented as a matrix.

The authenticator 100 may sample the first key vector and the second key vector using a lattice-based algorithm. The lattice-based algorithm refers to an encryption algorithm based on mathematical problems on a lattice called a lattice problem, and the lattice problem includes a Shortest Vector Problem (SVP), a Shortest Independent Vectors Problem (SIVP), and a Closest Vector Problem (CVP). The security of the lattice-based algorithm is based on the fact that it is difficult to solve the above-described lattice problem, and since it is difficult to find a lattice point closest to an arbitrary position in a lattice of hundreds of dimensions, if a key is matched to the corresponding lattice point, it is difficult to find a private key corresponding to the position through quantum computing, and thus the lattice-based algorithm may be an alternative. In one example, if any location on the lattice corresponds to a public key and a particular location close to the public key corresponds to a private key, the private key can be hidden at the intersection of the multi-dimensional lattice, the number of possibilities of shortest vectors for the private key is infinite, and the process of traversing the range of possibilities and the number of permutations in the quantum computer cannot take advantage of the advantages of the quantum computer over the existing computer due to its complex nature. That is, the encryption key may be determined only when the attacker knows his or her own path through the lattice, that is, the attacker has no way to calculate the path, so it may be said that it is theoretically impossible for the attacker to calculate the private key. In an embodiment, a Gaussian distribution method and a dejection sampling method may be used to sample key vectors among a plurality of vectors generated using the lattice-based algorithm.

The authenticator 100 may generate a public key and a private key by utilizing the generated key matrix, the first key vector, and the second key vector S300.

According to the technical idea of the present disclosure, a hacking attempt by quantum computing may be prevented by utilizing a lattice-based algorithm in a process of generating a key for the virtual private network VPN, and accordingly, security of the virtual private network VPN may be increased.

According to an embodiment, in the key matrix definition step S100, the authenticator 100 may generate a key random number using a random number generator S110. The random number generator refers to a device for generating a random number or symbol that cannot be theoretically predicted based on entropy, and may include a non-deterministic random bit generator (NRBG) and a deterministic random bit generator (DRBG) according to a noise source to be used. The authenticator 100 may generate a seed by substituting the key random number into a hash function S120, and generate a random polynomial ring using the seed S130. In addition, the authenticator 100 may define a key matrix corresponding to the random polynomial ring S140.

According to an exemplary embodiment of the present disclosure, when defining a key matrix, a random number generator, a hash function, and a random polynomial ring are used to maximize randomness of the key matrix, and as a result, randomness of a key may be maximized.

In one embodiment, in the public key and private key generation step S300, the authenticator 100 may define a key value using the key matrix, the first key vector, and the second key vector S310. In one example, the key value k for the key matrix A, the first key vector v1, and the second key vector v2 may be defined as Equation 1 below.

$$k = A \cdot v1 + v2 \quad \text{Equation 1}$$

The authenticator 100 may generate a key matrix and a key value as a public key S320, and generate a key matrix, a key value, a first key vector, and a second key vector as a private key S330. In one example, the public key (pk) and the private key (sk) may be generated as shown in Equation 2 below.

$$pk = (A, k), sk = (A, k, v1, v2) \quad \text{Equation 2}$$

The authenticator 100 according to an embodiment of the disclosure may generate a public key and a private key using a key value defined using a lattice-based algorithm, increase security of the public key by including a key vector in the private key, and fully decode data using the private key.

Although FIG. 4 illustrates an example in which the authenticator 100 generates a key, this is an example, and the server 200 may also generate a public key and a private key by the key generation method described in FIG. 4.

Figure 5:
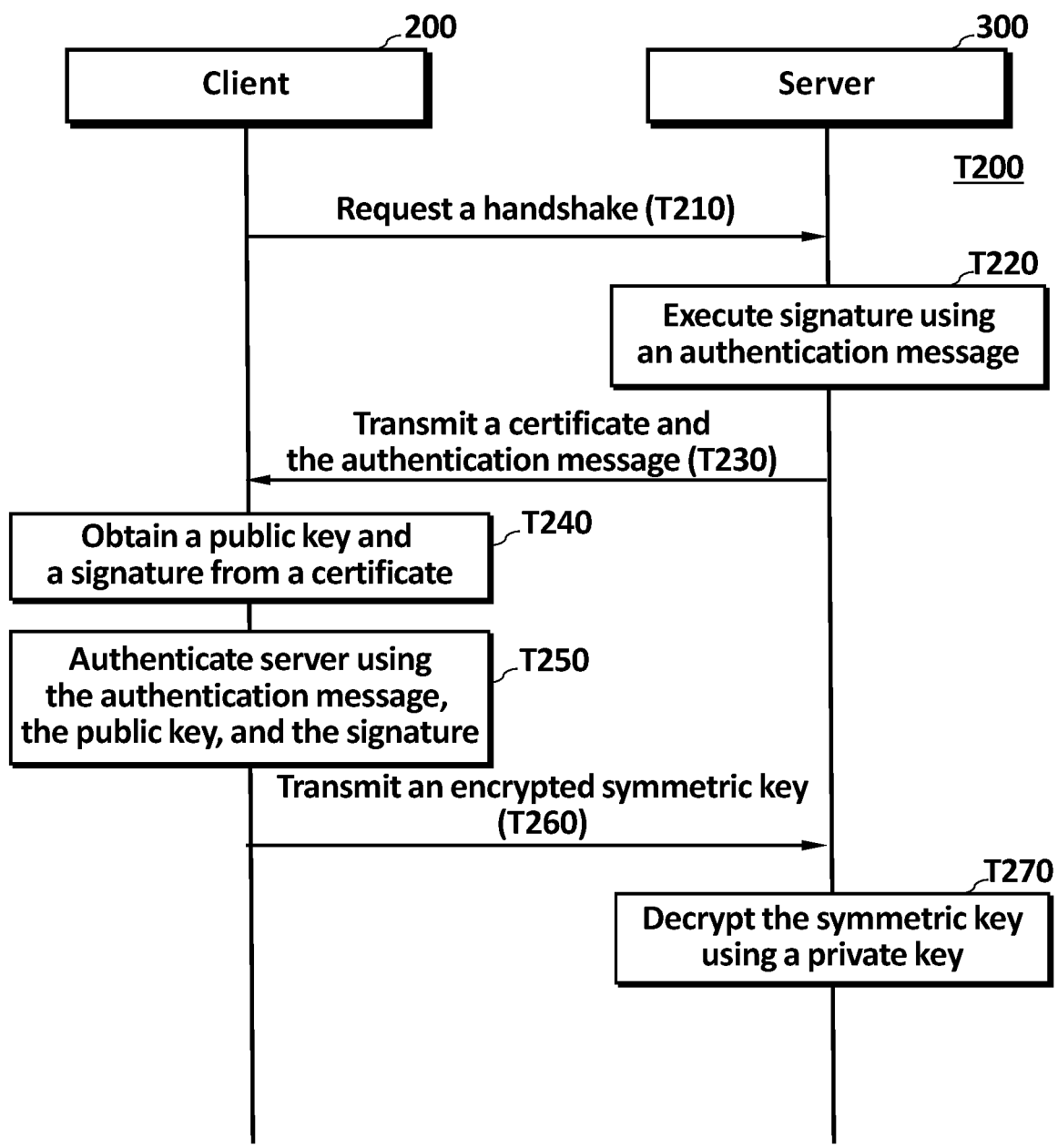
FIG. 5 is a flowchart illustrating a quantum resistant handshake method according to an embodiment of the present invention.

FIG. 5 is a flowchart illustrating a quantum resistant handshake method according to an embodiment of the present invention. In detail, FIG. 5 illustrates the handshake step T200 of FIG. 2 in detail.

Referring to FIG. 5, the client 200 may transmit a handshake request for forming a virtual private network to the server 300 T210. The server 300 may perform a signature using an authentication message in response to the handshake request T220. The signature operation of the server 300 will be described later with reference to FIG. 6.

The server 300 may include the generated signature in the authentication certificate and transmit the authentication message to the client 200 T230. The client 200 may obtain a public key and a signature from the certificate T240, and authenticate the server 300 by using the authentication message, the public key, and the signature T250. The authentication operation of the client 200 will be described later with reference to FIG. 9.

When the authentication of the server 300 is successful, the client 200 may transmit the symmetric key encrypted by the public key to the server 300 T260, and the server 300 may decrypt the symmetric key by using the private key T270. Thereafter, the client 200 may communicate with the server 300 through the virtual private network VPN using the symmetric key.

According to an exemplary embodiment of the present disclosure, by performing the handshake between the client 200 and the server 300 using the public key using the lattice-based algorithm, the public key in the certificate may not be exposed to the attacker even when the attacker captures the certificate in the process of transmitting the certificate between the client 200 and the server 300, and by utilizing the unique signature algorithm and the authentication algorithm, the signature of the server 300 and the authentication of the server 300 may be smoothly performed even when the public key using the lattice-based algorithm is used.

Figure 6:
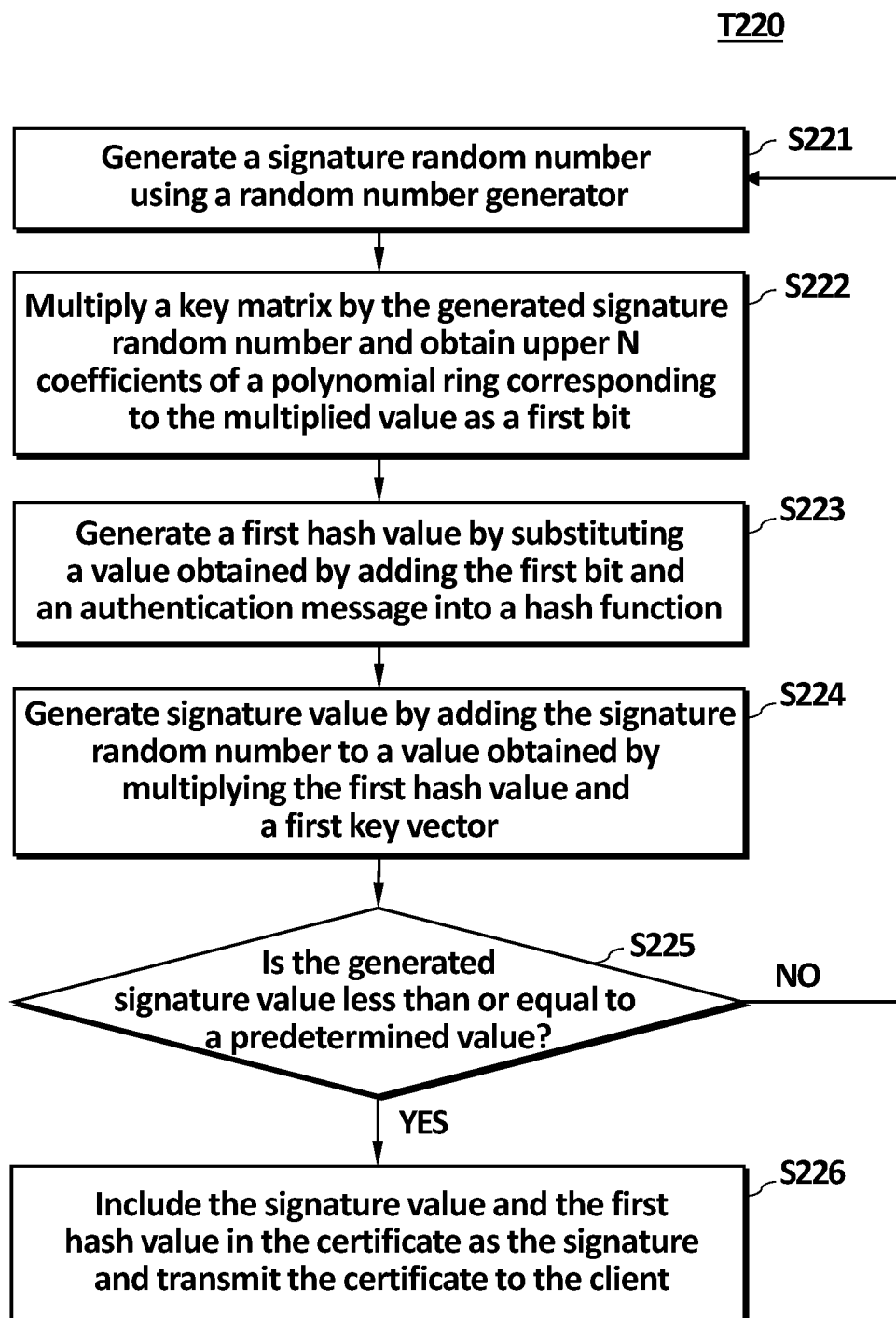
FIG. 6 is a flowchart illustrating a quantum resistant signature method according to an example embodiment.

FIG. 6 is a flowchart illustrating a quantum resistant signature method according to an example embodiment. In detail, FIG. 6 illustrates the signature step T220 of FIG. 5 in detail.

Referring to FIG. 6, the server 300 may generate a signature random number using a random number generator S221. The server 300 may calculate a first matrix by multiplying the key matrix included in the public key by the generated signature random number, and obtain upper N (N is a natural number) coefficients of the polynomial ring corresponding to the calculated first matrix as first bits S222. In one example, the server 300 may obtain the first bit by listing the top N coefficients in the polynomial ring. According to an exemplary embodiment of the present disclosure, the server 300 may determine the hash value by using the top N coefficients in the polynomial ring, thereby enabling accurate authentication in the authentication procedure despite the lattice-based algorithm.

The server 300 may generate a first hash value by substituting a value obtained by adding the first bit and the authentication message into a hash function S223. In an example, the authentication message may indicate a message having a meaning arbitrarily determined by the server 300, and the action of adding the first bit and the authentication message may mean an action of adding the first bit to a bit value corresponding to the authentication message.

The server 300 may generate a signature value by adding a signature random number to a value obtained by multiplying the first key vector included in the private key by the first hash value S224. For the first hash value h1, the first key vector v1, and the signature random number rn, the signature value sv may be determined according to the following Equation 3.

$$sv = h1 \cdot v1 + rn \qquad \text{Equation 3}$$

The server 300 may check whether the generated signature value is equal to or less than a predetermined value S225. The server 300 may include the signature value and the first hash value as the signature in the certificate and transmit the certificate to the client 200 when the generated signature value is less than or equal to the predetermined value S226, and when the generated signature value is not less than or equal to the predetermined value, the server 300 may generate a new signature random number and perform the operation of generating the signature value again.

According to an exemplary embodiment of the present disclosure, the server 300 may secure post quantum for a signature by determining the signature value using a lattice-based key vector, a hash value, and a signature random number, and may secure high security by adopting the signature value only when the signature value is equal to or less than a predetermined value.

Figure 7:
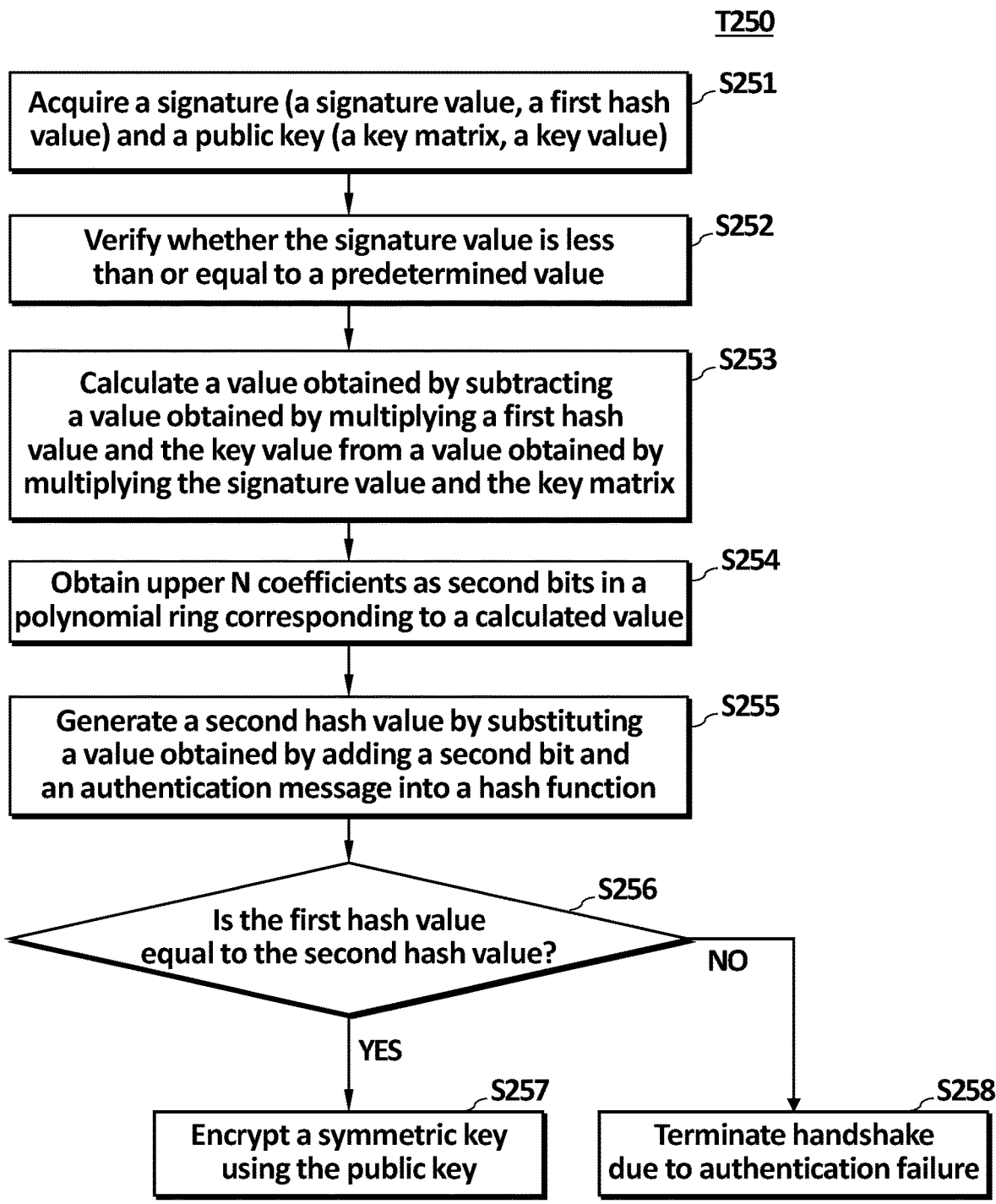
FIG. 7 is a flowchart illustrating a post quantum authentication method according to an embodiment of the present invention.

FIG. 7 is a flowchart illustrating a post quantum authentication method according to an embodiment of the present invention. In detail, FIG. 7 illustrates the authentication step T250 of FIG. 5 in detail.

Referring to FIG. 7, the client 200 may obtain a signature including a signature value and a first hash value, and a public key including a key matrix and a key value from a certificate S251. The client 200 may check whether the signature value is equal to or less than a predetermined value S252. In an embodiment, the predetermined value may be a value previously discussed with the server 300, and the client 200 may primarily determine whether the signature value is altered by determining whether the signature value is less than or equal to the predetermined value.

The client 200 may calculate a value obtained by subtracting a value obtained by multiplying the signature value by the key matrix and a value obtained by multiplying the first hash value by the key value. The client may calculate the following second matrix B with respect to the signature value sv, the key matrix A, the first hash value h1, and the key value k.

$$B = sv \cdot A - h1 \cdot k \qquad \text{Equation 4}$$

By Equation 1 and Equation 3, the second matrix B may be calculated as follows.

$$B = rn \cdot A - h1 \cdot v2 \qquad \text{Equation 5}$$

The client 200 may obtain upper N coefficients of the polynomial ring corresponding to the second matrix B as second bits S254. The client 200 may generate a second hash value by substituting a value obtained by adding the second bit and the authentication message into a hash function S255. In one example, the portion of the second matrix B may not be included in the upper coefficient, and accordingly, hash values for upper bits of the first matrix and the second matrix, which are multiples of the key matrix A, may be equal to each other only when the signature is valid according to the property of the hash function.

Therefore, when the first hash value included in the signature is equal to the second hash value obtained by the calculation S256, the client 200 may encrypt the symmetric key by using the public key S257 and transmit the encrypted symmetric key to the server 200, and when the first hash value included in the signature is not equal to the second hash value obtained by the calculation S256, the client 200 may terminate the handshake due to the authentication failure S258.

According to an embodiment of the present disclosure, by performing a signature and an authentication procedure by using an upper coefficient of a matrix, an accurate authentication procedure may be performed despite a lattice-based algorithm, and a safe virtual private network may be constructed even in quantum computing.

Although not shown, in one embodiment, the client 200 may additionally authenticate whether the certificate is valid through the authenticator 100.

Figure 8:
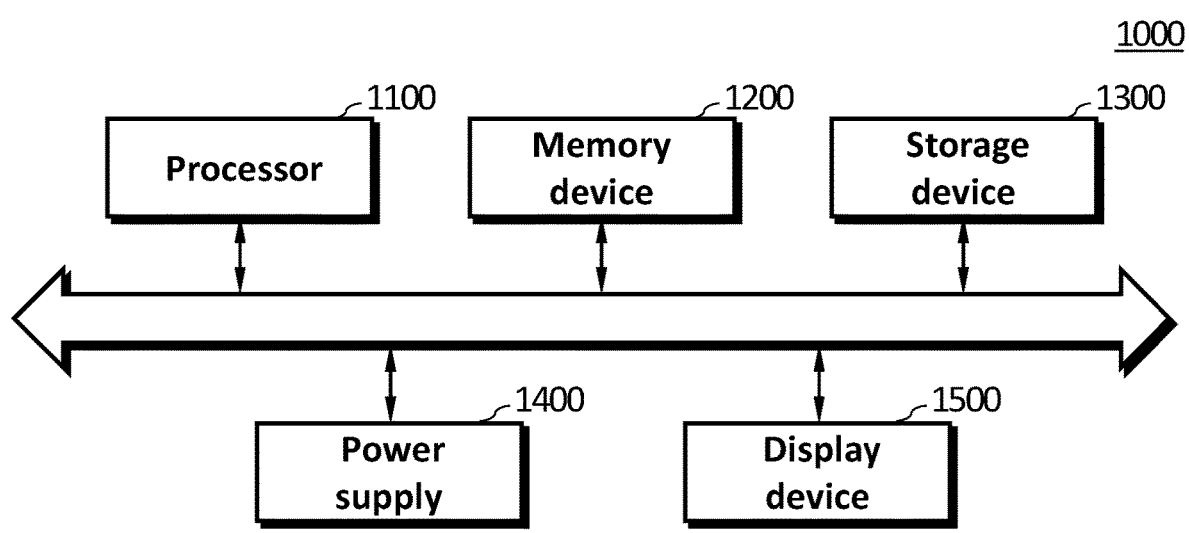
FIG. 8 is a block diagram illustrating a computing system according to an example embodiment.

FIG. 8 is a block diagram illustrating a computing system according to an example embodiment.

Referring to FIG. 8, the computing system 1000 may include any one of the authenticator 100, the client 200, and the server 300, and may include a processor 1100, a memory device 1200, a storage device 1300, a power supply 1400, and a display device 1500. Although not illustrated in FIG. 10, the computing system 1000 may further include ports for communicating with a video card, a sound card, a memory card, a universal serial bus (USB) device, other electronic devices, etc.

As described above, the processor 1100, the memory device 1200, the storage device 1300, the power supply 1400, and the display device 1500 included in the computing system 1000 may configure any one of the authenticator 100, the client 200, and the server 300 according to embodiments of the inventive concept to perform a method for forming a virtual private network. In detail, the processor 1100 may perform the operating method for the virtual private network operating system 10 described above with reference to FIGS. 1 to 7 by controlling the memory device 1200, the storage device 1300, the power supply 1400, and the display device 1500.

The processor 1100 may perform specific calculations or tasks. The processor 1100 may be a micro-processor or a Central Processing Unit (CPU). The processor 1100 may communicate with the memory device 1200, the storage device 1300, and the display device 1500 through a bus 1600 such as an address bus, a control bus, or a data bus. According to an embodiment, the processor 1100 may also be connected to an expansion bus such as a Peripheral Component Interconnect (PCI) bus.

The memory device 1200 may store data necessary for an operation of the computing system 1000. For example, the memory device 1200 may be implemented as a DRAM, a mobile DRAM, an SRAM, a PRAM, an FRAM, an RRAM, and/or an MRAM. The storage device 1300 may include a solid state drive, a hard disk drive, a CD-ROM, etc. The storage device 1300 may store programs, application program data, system data, operating system data, and the like related to the method for forming the virtual private network described above with reference to FIGS. 1 to 7.

The display apparatus 1500 is an output means for notifying a user, and may notify a user or the like of information on a method for forming a virtual private network by displaying the information on the method. The power supply 1400 may supply an operating voltage required for an operation of the computing system 1000.

According to the technical idea of the present invention, in a process of performing authentication for a signature and a signature of a server in order to provide a virtual private network, the signature and the authentication are performed by using a post quantum cryptography including a grid algorithm, thereby providing high security and providing a safe virtual private network which is not hacked even in a quantum computer.

Exemplary embodiments have been invented in the drawings and specification as described above. Although embodiments have been described using specific terms in the present specification, they are used only for the purpose of describing the technical spirit of the present invention and are not used to limit the meaning or limit the scope of the present invention described in the claims. Therefore, it will be understood by those of ordinary skill in the art that various modifications and other equivalent embodiments are possible therefrom. Therefore, the true technical protection scope of the present invention should be determined by the technical spirit of the appended claims.

What is claimed is:

1. A method for forming a virtual private network performed by a server including a processor, the method comprising the steps of:
   generating, by the processor, a private key including a first key vector generated by a lattice-based algorithm, a second key vector having a first distance from the first key vector, and a key matrix corresponding to a random polynomial ring;
   receiving, by the processor, a handshake request from a client;
   performing, by the processor, a signature using the private key;
   transmitting, by the processor, a certificate and an authentication message including the signature to the client;
   determining, by the processor, whether a signature value is equal to or less than a predetermined value; and
   transmitting, by the processor, the certificate and the authentication message to the client only when the signature value is equal to or less than the predetermined value,
   wherein the performing of the signature includes:
   obtaining, by the processor, a first bit based on the key matrix;
   obtaining, by the processor, a first hash value for the first bit and the authentication message; and
   generating, by the processor, the signature value using the first hash value and the first key vector,
   wherein the obtaining the first bit based on the key matrix includes:
   obtaining, by the processor, a signature random number by using a random number generator;
   calculating, by the processor, a first matrix by multiplying the key matrix by the signature random number; and
   obtaining, by the processor, upper N (N is a natural number) coefficients of a polynomial ring corresponding to the first matrix as the first bit,
   wherein the generating of the signature value by using the first hash value and the first key vector comprises calculating, by the processor, the signature value by adding the signature random number to a value obtained by multiplying the first hash value and the first key vector.

2. The method for forming a virtual private network of claim 1, wherein the signature comprises the signature value and the first hash value.

3. The method for forming a virtual private network of claim 1, further comprising the steps of:
   receiving, by the processor, an encrypted symmetric key from the client;
   decrypting, by the processor, the symmetric key utilizing the private key; and
   communicating, by the processor, with the client utilizing a virtual private network utilizing the symmetric key.

4. A method for forming a virtual private network performed by a client including a processor, the method comprising the steps of:
   sending, by the processor, a handshake request to a server;
   receiving, by the processor, a certificate and an authentication message from the server in response to the handshake request;
   obtaining, by the processor, a signature and a public key from the certificate;

authenticating, by the processor, the server by utilizing the signature and the public key;

determining, by the processor, whether a signature value is less than or equal to a predetermined value; and performing, by the processor, an authentication procedure only when the signature value is equal to or less than the predetermined value, wherein the public key includes a key matrix corresponding to a random polynomial ring and a key value generated by at least one key vector generated by a lattice-based algorithm, wherein the signature includes the signature value and a first hash value, wherein the authenticating of the server by using the signature and the public key includes:

calculating, by the processor, a second matrix based on the signature value and the key matrix;

obtaining, by the processor, upper N (N is a natural number) coefficients of a polynomial ring corresponding to the second matrix as second bits; and authenticating, by the processor, the server based on the second bits, wherein the calculating of the second matrix includes calculating, by the processor, the second matrix by subtracting a value obtained by multiplying the signature value and the key matrix to a value obtained by multiplying the first hash value and the key value.

5. The method for forming a virtual private network of claim 4, wherein the authenticating of the server based on the second bit comprises the steps of:

obtaining, by the processor, the second bit and a second hash value for the authentication message;

determining, by the processor, whether the second hash value is equal to the first hash value; and determining, by the processor, that the authentication of the server is successful when the second hash value is equal to the first hash value.

6. The method for forming a virtual private network of claim 4, further comprising the steps of:

encrypting, by the processor, a symmetric key using the public key by the processor when the server is successfully authenticated;

transmitting, by the processor, the encrypted symmetric key to the server by the processor; and communicating, by the processor, with the server using the virtual private network by the processor using the symmetric key.

* * * * *